Aug. 4, 1931.  E. Y. SCHAEFFER  1,817,586

ANTISKID CHAIN

Filed Oct. 18, 1930

Inventor

Earl Y. Schaeffer

By Clarence A. O'Brien

Attorney

Patented Aug. 4, 1931

1,817,586

UNITED STATES PATENT OFFICE

EARL Y. SCHAEFFER, OF KUTZTOWN, PENNSYLVANIA

ANTISKID CHAIN

Application filed October 18, 1930. Serial No. 489,639.

This invention relates generally to anti-skid chains for use on wheeled vehicles, particularly automobiles, and has for its primary object to provide, in a manner as hereinafter set forth, an anti-skid chain embodying novel means for detachably connecting the cross chains to the side chains in a manner to positively prevent the accidental detachment of the cross chains from the side chains but which will permit the removal of the cross chains with dispatch when it is so desired, as well as for the purpose of renewing the cross chains when the same become worn.

Other objects of the invention are to provide an anti-skid chain of the character described which will be simple in construction, strong, durable, efficient in use and which may be manufactured at low cost.

All of the foregoing and still further objects and advantages of the invention may become apparent from a study of the following specification, taken in connection with the accompanying drawings wherein like characters of reference designate corresponding parts throughout the several views, and wherein:—

Figure 1:
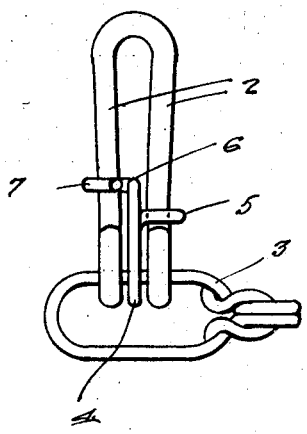
Figure 1 is a view in front elevation of an anti-skid device constructed in accordance with this invention showing a cross chain hook connected with a side chain link and with the keeper or locking device which constitutes an important feature of the invention mounted in position thereon.

Referring to the drawings in detail, it will be seen that the reference numeral 1 designates, in broken lines one of the end links of an anti-skid chain cross chain to which is coupled a pair of integrally connected, spaced, coextensive hooks 2 for engagement with side chain link 3 which is of conventional construction. The hooks 2 are open at all times for engagement with the link 3.

Figure 2:
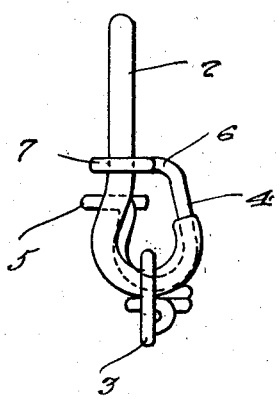
Figure 2 is a view in side elevation of the invention.
Figure 4:
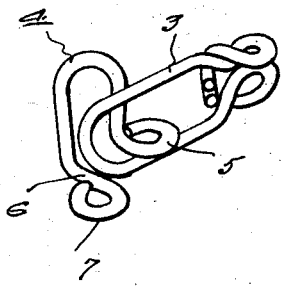
Figure 4 is a view in perspective showing the side chain link after the cross chain hook has been detached therefrom with the keeper or locking member in the position in which it is placed to permit the complete detachment of the cross chain hook.

A substantially U-shaped keeper or locking member 4 is adapted for disposition between the hooks 2 in the manner best illustrated in Figures 1 and 2 of the drawings. The keeper or locking member 4 is disposed longitudinally between the hooks 2 at right angles to said hooks and one of the legs of the keeper or locking member terminates in an integral, right angularly disposed, laterally extending eye 5 for slidable engagement over one of the hooks 2 from the free ends of said hooks. The leg of the keeper or locking member 4 upon which the eye 5 is formed is disposed between the shank portions of the hooks 2. The other leg of the keeper or locking member 4 is of materially greater length than the first named leg and extends upwardly between the bill portions of the hooks 2 and projects above the free ends of the bill portions as clearly seen in Figures 1 and 2. A substantially right angular arm or extension 6 is directed inwardly from the upper end of the longer of the legs of the keeper or locking member 4 between the shanks of the hooks 2 and said arm or extension 6 terminates in an integral, laterally disposed eye 7 for slidably receiving the hook 2 which is free of the eye 5.

Figure 3:
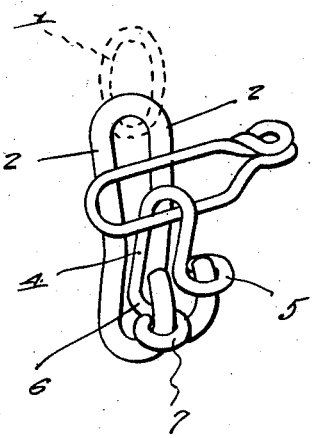
Figure 3 is a perspective view showing the position of the various elements during the course of detaching the cross chain hook from the side chain link.

When the keeper or retaining member 4 is in the position illustrated in Figures 1 and 2 of the drawings, it will be seen that the longer of the legs of said keeper or locking member will effectively prevent disengagement of the hooks 2 from the links 3. When it is desired to detach the hooks 2 from the link 3, the keeper or locking member 4 is manipulated in a manner to slide the eyes 5 and 7 toward and off of the free ends of the hooks 2 in the manner best illustrated in Figure 3 of the drawings. This is usually best accomplished by swinging the U-shaped portion of the keeper or locking member 4 downwardly, then outwardly and then upwardly to a substantially vertical position, this movement of the keeper or locking member being guided by the hooks 2 upon which the eyes 5 and 7 are slidably mounted.

It is believed that the many advantages of anti-skid chain constructed in accordance with this invention will be readily understood, and although the preferred embodiment of the invention is as illustrated and described, it is to be understood that changes in the details of construction may be had which will fall within the scope of the invention as claimed.

Having thus described my invention, what is claimed as new is:—

1. In an anti-skid chain of the character described, means for detachably connecting a cross chain to a side chain link comprising a pair of spaced, coextensive hooks connected to the cross chain and detachably engageable with the side chain link, and a substantially U-shaped keeper detachably mounted on the hooks between said hooks and engageable with the cross chain link in a manner to prevent detachment of the hooks therefrom, said keeper straddling one side of the link and having its bight portion substantially in transverse alignment with the hooks when in operative position.

2. In an anti-skid chain of the character described, means for detachably connecting a cross chain to a side chain link comprising a pair of spaced, coextensive hooks connected to the cross chain and detachably engageable with the side chain link, a substantially U-shaped keeper, and eyes on the ends of the keeper for slidable engagement on the hooks in a manner to removably mount said keeper thereon, said keeper engageable with the cross chain link in a manner to prevent detachment of the hooks therefrom, said keeper straddling one side of the link and having its bight portion substantially in transverse alignment with the hooks when in operative position.

3. In an anti-skid chain of the character described, means for detachably connecting a cross chain to a side chain link comprising a pair of spaced, integrally connected co-extensive hooks connected to the cross chain and detachably engageable with the side chain link, a substantially U-shaped keeper mounted longitudinally between the hooks, and eyes on the ends of the keeper for slidable engagement on the hooks in a manner to removably mount the keeper thereon, said keeper engageable with the cross chain link in a manner to prevent detachment of the hooks therefrom, said keeper straddling one side of the link and having its bight portion substantially in transverse alignment with the hooks when in operative position.

4. In an anti-skid chain of the character described, means for detachably connecting a cross chain to a side chain link comprising a pair of spaced, integrally connected co-extensive hooks connected to the cross chain and detachably engageable with the side chain link, a substantially U-shaped keeper mounted longitudinally between the hooks, and eyes on the ends of the keeper for slidable engagement on the hooks in a manner to removably mount the keeper thereon, said keeper engageable with the cross chain link in a manner to prevent detachment of the hooks therefrom, one of the legs of the keeper being of greater length than the other leg of the keeper, and an integral extension on said one leg extending at an angle therefrom.

5. In an anti-skid chain of the character described, means for detachably connecting a cross chain to a side chain link comprising a pair of integrally connected, spaced, coextensive hooks connected to the cross chain and detachably engageable with the side chain link, a substantially U-shaped keeper adapted for disposition longitudinally between the hooks, one of the legs of the keeper being of greater length than the other leg of the keeper, a right angularly disposed, laterally extending eye formed integrally on the shorter of the keeper legs for slidable mounting on one of the hooks, an integral angularly disposed extension on the longer of the keeper legs, an integral laterally extending eye on the free end of the extension for slidable mounting on the other of the hooks, the eyes constituting means for removably securing the keeper in position on the hooks, said keeper engageable with the cross chain link in a manner to prevent detachment of the hooks therefrom.

In testimony whereof I affix my signature.

EARL Y. SCHAEFFER.